United States Patent
Lisberger

(10) Patent No.: US 9,314,739 B2
(45) Date of Patent: Apr. 19, 2016

(54) PROCESS AND APPARATUS FOR DENOXING OF FLUE GASES

(75) Inventor: Manfred Lisberger, Riedau (AT)

(73) Assignee: Scheuch GmbH, Aurolzmuenster (AT)

( * ) Notice: Subject to any disclaimer, the term of this patent is extended or adjusted under 35 U.S.C. 154(b) by 0 days.

(21) Appl. No.: 13/384,371

(22) PCT Filed: Jun. 14, 2010

(86) PCT No.: PCT/AT2010/000212
§ 371 (c)(1),
(2), (4) Date: Mar. 29, 2012

(87) PCT Pub. No.: WO2011/006175
PCT Pub. Date: Jan. 20, 2011

(65) Prior Publication Data
US 2012/0183463 A1  Jul. 19, 2012

(30) Foreign Application Priority Data
Jul. 15, 2009 (AT) ................ A 1109/2009

(51) Int. Cl.
*B01D 53/86* (2006.01)
*F01N 3/20* (2006.01)

(52) U.S. Cl.
CPC .......... *B01D 53/8625* (2013.01); *F01N 3/2066* (2013.01)

(58) Field of Classification Search
None
See application file for complete search history.

(56) References Cited

U.S. PATENT DOCUMENTS

| 5,224,334 | A | 7/1993 | Bell |
| 5,366,708 | A * | 11/1994 | Matros et al. ............ 423/210 |
| 6,156,277 | A | 12/2000 | Leibacher et al. |
| 7,399,451 | B1 * | 7/2008 | Heed ...................... 422/175 |
| 2002/0022207 | A1 * | 2/2002 | Streit et al. ................ 432/15 |
| 2006/0011115 | A1 * | 1/2006 | Breen et al. .............. 110/345 |
| 2008/0050297 | A1 * | 2/2008 | Harold et al. ........... 423/239.1 |
| 2009/0130011 | A1 * | 5/2009 | Abrams et al. .......... 423/239.1 |

FOREIGN PATENT DOCUMENTS

| AT | 505 542 B1 | 2/2009 |
| DE | 35 15 551 A1 | 10/1986 |
| DE | 36 37 395 A1 | 5/1988 |
| DE | 44 32 316 A1 | 3/1996 |
| DE | 197 05 663 A1 | 4/1998 |

(Continued)

OTHER PUBLICATIONS

Austrian Patent Office Search Report, Dated January 7, 2010.

*Primary Examiner* — Melvin C Mayes
*Assistant Examiner* — Sheng H Davis
(74) *Attorney, Agent, or Firm* — Laurence A. Greenberg; Werner H. Stemer; Ralph E. Locher

(57) ABSTRACT

A process and an apparatus denox flue gases containing carbon monoxide and/or gaseous organic substances with at least one catalyst for catalytic reduction of the nitrogen oxide NOx and a heat exchanger for heating the flue gases from recovery of the residual heat of the denoxed flue gases before the catalytic reduction to a reaction temperature of 160° C. to 500° C. For the best possible denoxing of the flue gases with simultaneous minimization of the externally supplied energy needed, it is envisaged that the losses associated with the heat movement in the heat exchanger will be compensated for by providing at least one stage for regenerative post combustion of the carbon monoxide and/or of the gaseous organic substances.

5 Claims, 3 Drawing Sheets

(56) References Cited

FOREIGN PATENT DOCUMENTS

| DE | 197 20 205 A1 | 11/1998 |
| JP | 2000274643 A | 10/2000 |
| JP | 2001113132 A | 4/2001 |
| JP | 2002147735 A | 5/2002 |
| JP | 2003161424 A | 6/2003 |
| JP | 3109606 U | 5/2005 |
| WO | 97/09112 A1 | 3/1997 |

* cited by examiner

PROCESS AND APPARATUS FOR DENOXING OF FLUE GASES

BACKGROUND OF THE INVENTION

Field of the Invention

This application claims priority to PCT/AT/2010/000212

The invention relates to a process for denoxing flue gases comprising carbon monoxide and/or gaseous organic substances by selective catalytic reduction of the nitrogen oxides, wherein the flue gases, prior to the catalytic reduction, are heated to a reaction temperature of 160° C. to 500° C. by means of heat exchange of the recovered residual heat of the denoxed flue gases.

Further, the invention relates to an apparatus for denoxing carbon monoxide and/or flue gases comprising carbon monoxide and/or gaseous organic substances with at least one catalyser for the catalytic reduction of the nitrogen oxides, and a heat exchanger for heating the flue gases from recovery of the residual heat of the denoxed flue gases prior to the catalytic reduction to a reaction temperature of 160° C. and 500° C.

The present invention, in principle, relates to the denoxing of any flue gases comprising carbon monoxide and/or gaseous organic substances, for example flue gases developing during the manufacture of cement clinker, where the raw materials needed for forming the cement clinker are heated in rotary kilns to temperatures from 1350° C. up to 1700° C. The raw materials are normally preheated in a pre-heating tower comprising several sequentially arranged cyclones, before reaching the rotary kiln. The exhaust gases pass the production process in a counter flow to the material flow and undergo exhaust gas treatment once they have left the last cyclone heating stage. During denoxing which forms part of the exhaust gas treatment, splitting of the nitrogen oxides $NO_x$ in the exhaust gases into environmentally neutral atmospheric nitrogen $N_2$ and water $H_2O$ at an optimal operating temperature is achieved through the use of so-called SCR (selective catalytic reduction) catalysers to which ammonia or compounds releasing ammonia such as ammonia water or urea has been added. Following cooling or heat recovery, if used, the exhaust gases finally reach a filter stage where they are freed from dust before being released to atmosphere. The filter stage prior to releasing the exhaust gases into the atmosphere may, for example, be formed by electrical filters or bag filters.

The relatively high dust content in the raw gases, particularly during the manufacture of cement clinker, leads to the catalysers becoming blocked very quickly. In order to increase the service life of catalysers they are frequently arranged on the clean-gas side, i.e. after the dust has been removed from the raw gases. The disadvantage with this arrangement consists in that the flue gases must be heated prior to the catalytic reduction to the necessary reaction temperature of normally 160° C. to 500° C. Flue gases are often heated by means of a recuperator or heat exchanger which extracts heat from the denoxed flue gases and feeds it to the flue gases prior to the catalytic reduction. The losses resulting from the heat displacement in the heat exchange make it mandatory to additionally heat the flue gases by means of external energy.

The AT 505 542 B1 describes, for example, a plant for cleaning the flue gases during cement manufacture, wherein the flue gases are heated using at least one combustion facility for power generation, for example a gas turbine or gas motor which is operated with natural gas.

The DE 197 05 663 A1 describes a facility for denoxing flue gases wherein, however, due to the already high exhaust gas temperature of approx. 800° C. to 1000° C. heating of the gases for catalytic reduction is not necessary.

BRIEF SUMMARY OF THE INVENTION

It is the requirement of the invention to propose a process and an apparatus of the kind mentioned above through which the use of external energy can be minimised or avoided while at the same time achieving a high degree of denoxing. Disadvantages of known processes or apparatuses are to be reduced or avoided.

The requirement according to the invention with respect to the process proposed is met in that the losses resulting from heat displacement in the heat exchange are at least partially compensated for by regenerative postcombustion of the carbon monoxide and/or the gaseous organic substances. Postcombustion for the cleaning of flue gases is known. By this is understood the combustion of flue gases for reducing organic substances. During thermal postcombustion it is normal to reach combustion temperatures in the range from approx. 750 to 900° C. Additional fuels and combustion air may be added if required. Catalytic postcombustion is characterised by a catalyser present in the combustion chamber which accelerates the oxidation processes. This requires lower combustion temperatures of approx. 300 to 500° C. With regenerative postcombustion it is possible to considerably reduce the amount of fuel added by increasing the flue gas temperature to almost combustion temperature by means of heat exchange. According to the invention provision is therefore made for burning the carbon monoxide and/or the gaseous organic substances in the flue gases off in a postcombustion process. The energy generated during postcombustion is used, according to the invention, to raise the temperature of the flue gases to the catalytic reaction temperature. Apart from the energy-saving manner in which the flue gases are heated for catalytic reduction, a decrease is also achieved in the carbon monoxides and/or gaseous substances contained in the flue gases. The required amount of energy, for example in the form of natural gas, may be considerably lowered by the process according to the invention or in other words, the addition of external energy is necessary only during start-up. The process according to the invention may be realised at a relatively small amount of expenditure and the process can be carried out in a cost-effective manner. Due to the regenerative postcombustion the flue gases are not only denoxed, but their content of gaseous organic substances is also reduced. Due to a reduction of the gaseous organic substances, in particular the so-called "volatile organic compounds" (VOCs), the odours from the flue gases are reduced.

According to one variant of the process according to the invention provision is made for the flue gases to be directed in alternating direction through at least two channels with several sequentially arranged heat storage modules and a space in-between them for regenerative postcombustion and for the catalytic reduction of the nitrogen oxides to be carried out in catalysers arranged between the heat storage modules. With this variant of the denoxing process according to the invention heat storage modules and catalysers are combined in channels with the heat required for catalytic reduction being extracted from the flue gases due to the alternating direction of the flue gases. Due to the regenerative postcombustion of the carbon monoxide and/or the gaseous organic substances in the flue gases the process can be performed auto-thermally, i.e. without an external energy supply thus achieving high efficiency.

For start-up and/or for maintaining the operating temperature for denoxing of the flue gases, external heat energy may be introduced. This external heat energy may, for example, be generated by burning external energy sources such as natural gas or oil.

To increase the energy which is achievable during regenerative postcombustion combustible substances such as natural gas or oil may be introduced into the flue gases prior to the regenerative postcombustion.

The carbon monoxide or gaseous organic substances content in the flue gases may be specifically increased with the aid of control-technical measures. During cement manufacture, for example, reducing the amount of air supplied to the rotary kiln will lead to an increase in the content of carbon monoxide, thereby improving energy recovery through regenerative postcombustion.

Advantageously the flue gases are denoxed to at least 60%.

The requirement of the invention is also met by an above-mentioned apparatus for denoxing carbon monoxide and/or flue gases containing gaseous organic substances, wherein, for example, in order to compensate for the heat displacement losses in the heat exchanger at least one stage is provided for regenerative postcombustion of the carbon monoxide or the gaseous organic substances. The advantages of the apparatus according to the invention may be deducted from the above-mentioned advantages of the denoxing process.

With one variant of the denoxing apparatus according to the invention the at least one postcombustion stage is formed by at least two channels with several sequentially arranged heat storage modules and a space arranged in between them for regenerative postcombustion, wherein the flue gases are directed through the channels in alternating direction, wherein at least one catalyser per channel is arranged between the heat storage modules for catalytic reduction of the nitrogen oxides.

The heat storage modules are preferably formed of ceramic honeycomb bodies.

With an alternative embodiment the at least one postcombustion stage is arranged downstream of the at least one heat exchanger and upstream of the at least one catalyser. Thus any losses from the heat displacement in the heat exchanger are compensated for by the postcombustion stage thereby achieving the desired reaction temperatures of 160° C. to 500° C. for the catalytic reduction of the flue gases.

According to a further feature of the invention a device is provided for supplying external heat energy for start-up and/or for maintaining the operating temperature of denoxing the flue gases. As already mentioned above the external heat energy may be produced by burning external energy sources such as natural gas or oil.

In order to improve postcombustion a line may be provided for adding combustible substances, for example natural gas or oil.

Through means for specifically increasing the carbon monoxide and/or gaseous organic substances content in the flue gases it is possible to increase the energy yield from the regenerative postcombustion. As already mentioned above these means for specifically increasing the carbon monoxide and/or gaseous organic substances content in the flue gases may be formed, for example, by a throttle for reducing the air intake in a kiln in which the flue gases are generated. Due to these degraded combustion conditions in the kiln it is possible to increase the carbon monoxide and/or gaseous organic substances content with minor technical effort.

BRIEF DESCRIPTION OF THE SEVERAL VIEWS OF THE DRAWING

The present invention will now be explained in detail with reference to the enclosed drawings, in which.

DESCRIPTION OF THE INVENTION

Figure 1:
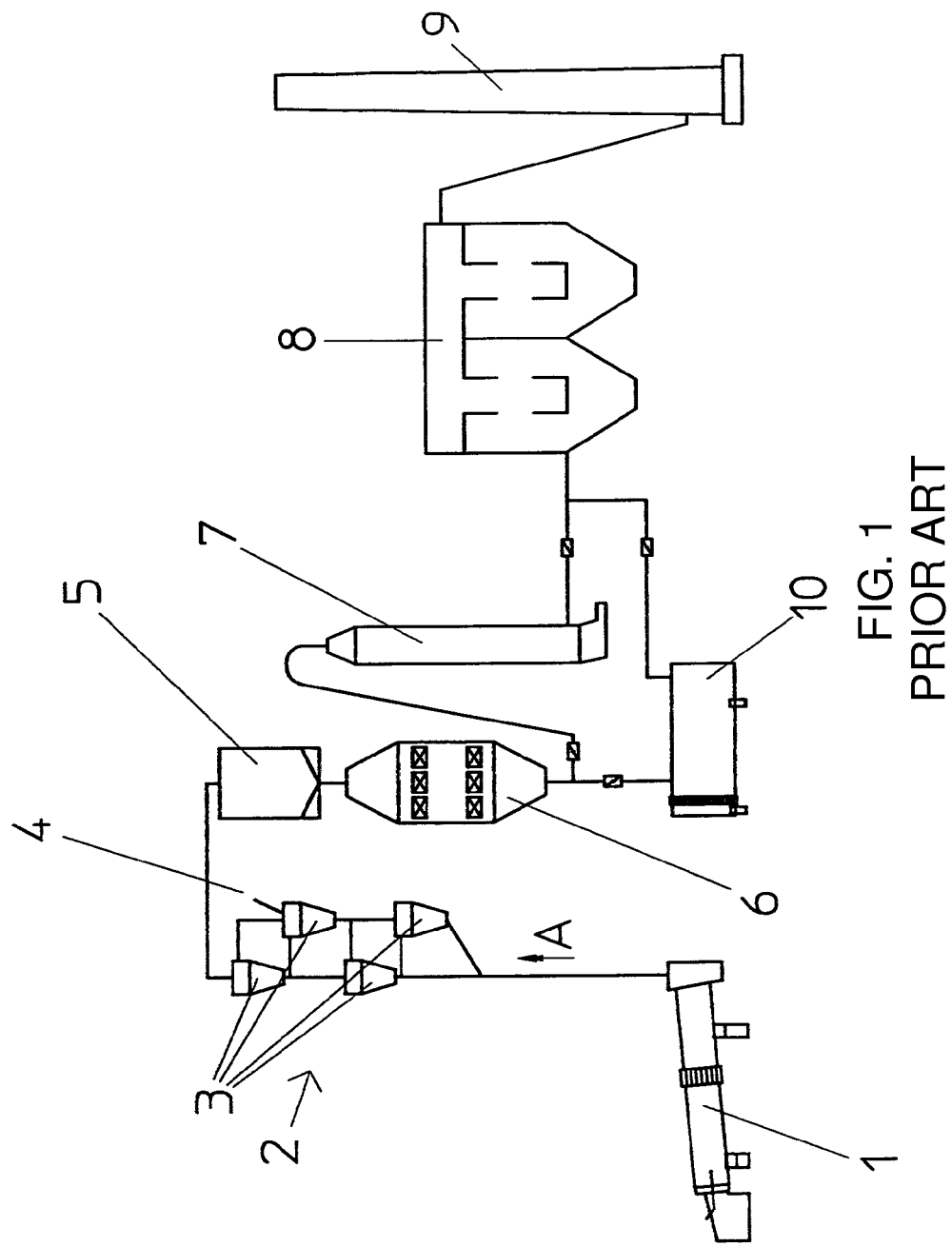
FIG. 1 shows a schematic representation of the plant for the manufacture of cement clinker according to the state of the art.

FIG. 1 shows a schematic view of an apparatus for the manufacture of cement clinker according to the state of the art. The apparatus for the manufacture of cement clinker comprises a kiln, in particular a rotary kiln 1, in which the raw materials for the manufacture of cement clinker are fired. Normally the raw materials are preheated in a pre-heating tower 2 which may consist of a plurality of cyclones 3 arranged one above the other. To this end the raw materials are fed into the preheating tower 2 via a material supply 4. Working on the countercurrent principle the raw material reaches the rotary kiln 1, whereas the flue gases A flow against the flow of the raw material through the pre-heating tower 2. downstream of the preheating tower 2 the raw gases A containing both nitrogen oxide and dust reach a filter 5 where the dust content in the raw gases A is reduced accordingly. Thereafter the raw gases A reach a catalyser 6 in which due to the respective catalytic reaction the nitrogen oxides $NO_x$ are partly converted into nitrogen $N_2$ and water $H_2O$. The denoxed raw gases A may be directed, as required, through a cooling apparatus 7 in order to lower the temperature of the flue gases A to a level which is suitable for a subsequent filter stage 8 for removing the dust from the flue gases on the one hand. On the other such a cooling apparatus 7 may be utilised to recover the heat contained in the flue gases A and to heat the flue gases A before they reach the catalyser 6. After the filter stage 8, which may be formed by tube filters or electro filters the denoxed and dedusted flue gases A reach the atmosphere via a chimney 9. After the catalyser 6 the fired raw material conveyed together with the flue gases A reaches a mill 10 where it is ground to a certain size before being packed.

As already mentioned, it is normally not possible through heat recovery to heat the flue gases A to the required reaction temperature of preferably 160° C. to 500° C. for catalytic reduction in the catalyser 6. It is therefore necessary, according to the state of the art, to compensate for the heat loss by introducing external energy. However, supplying external energy shall be avoided because of the cost associated with it.

Figure 2:
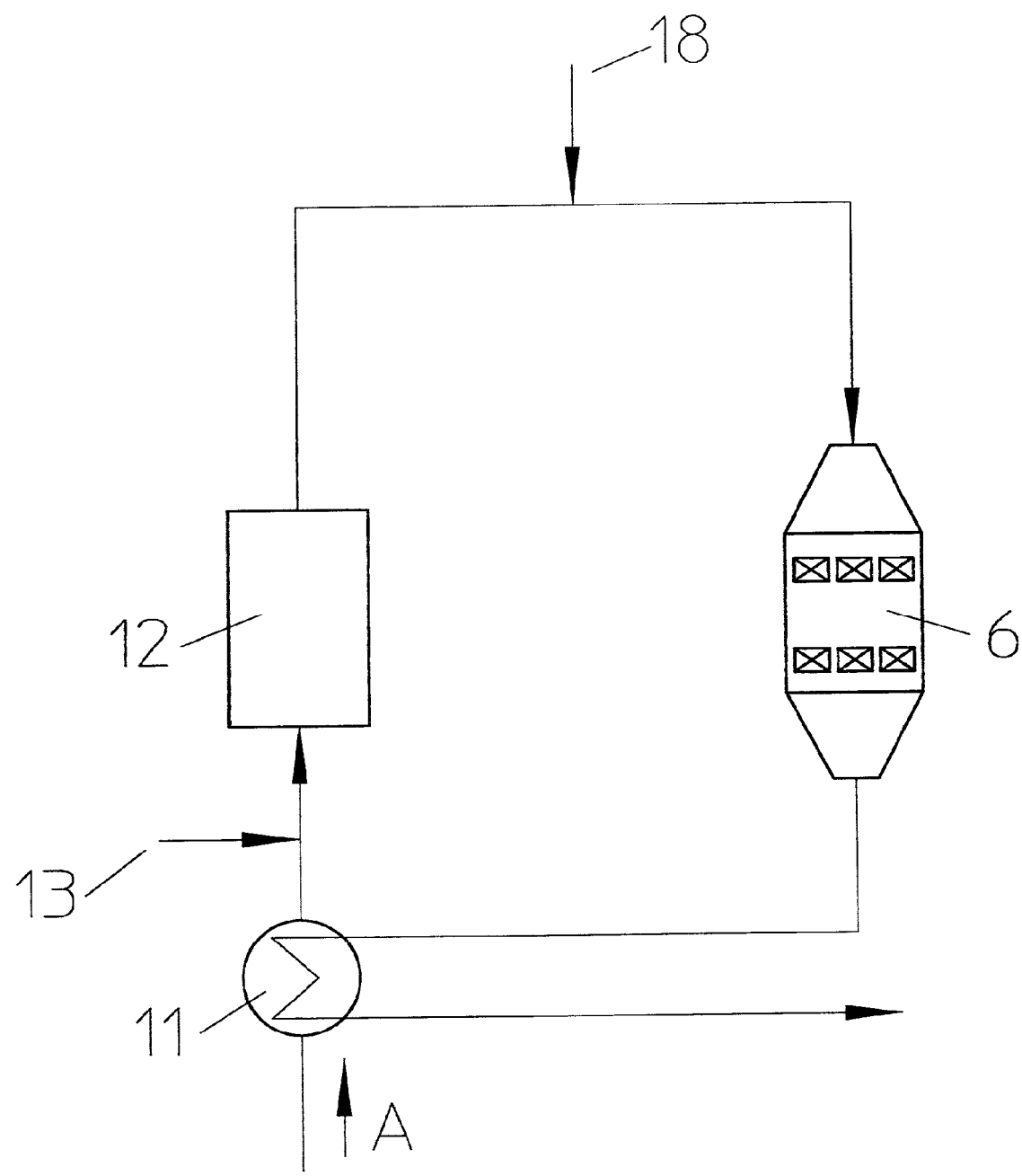
FIG. 2 shows a schematic representation of an embodiment of a denoxing apparatus according to the present invention.

FIG. 2 shows a possible embodiment of the invention involving regenerative postcombustion of the carbon monoxide in the flue gases A. The flue gases A, after the usual filtering (not shown), reach a heat exchanger 11, where they are heated to the reaction temperature $T_R$ of the catalyser 6 of 160° C. to 500° C. The heat exchanger 11 extracts the heat energy from the flue gases in the catalyser 6 and possibly after a subsequent filter stage, thereby bringing the flue gases A up to the reaction temperature $T_R$ after they have entered the catalyser 6. Normally, heating of the flue gases to the required reaction temperature is not possible due to the heat displacement losses in the heat exchanger 11, and it is necessary to introduce external energy. With the embodiment according to FIG. 2 heat displacement losses in the heat exchanger 11 are compensated for in that the carbon monoxide CO and/or the gaseous organic substances in the flue gases A undergo post-combustion. To this end a stage 12 is provided between heat exchanger 11 and catalyser 6 for regenerative postcombustion of the carbon monoxide CO and/or the gaseous organic substances in the flue gases A. Apart from controlling the external energy amount, during postcombustion in stage 12 the carbon monoxide CO and/or the gaseous organic substances in the flue gases are also reduced. The nitrogen oxides created during postcombustion in stage 12 and the nitrogen oxides $NO_x$ contained in the flue gases are finally disposed of in catalyser 6. For start-up and/or for maintaining the operating temperature of denoxing the flue gases A, a device 13 for feeding external energy, for example a natural gas line, may be arranged upstream of postcombustion stage 12. Thus the apparatus according to the invention, due to lowering the amount of external energy, not only increases efficiency but also reduces both the nitrogen oxides $NO_x$ and the high carbon monoxide CO and/or gaseous organic substances content. Due to burning off the flue gases it is not necessary to fit an additional layer of a so-called oxidation catalyser. An oxidation catalyser ensures that the carbon monoxide CO is oxidised to form carbon dioxide $CO_2$. These special catalysers are very cost-intensive due to doping by means of precious metals such as platinum, palladium or such like and also very susceptible to poisoning by means of heavy metals.

Figure 3:
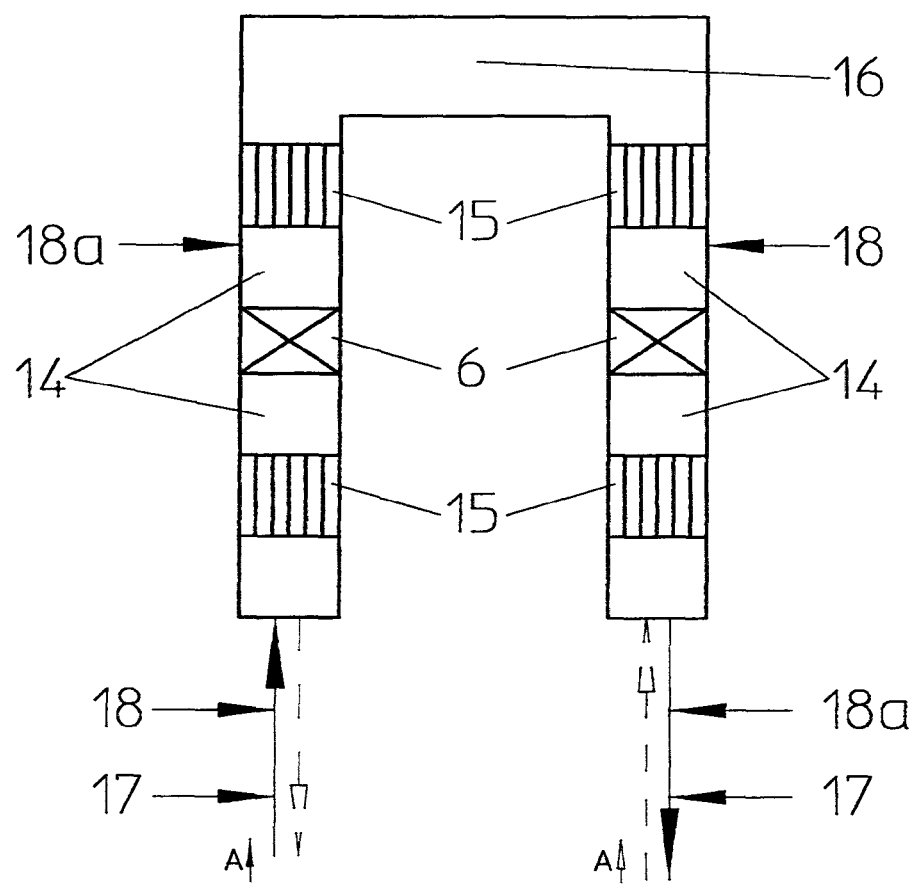
FIG. 3 shows a further embodiment of a denoxing apparatus according to the present invention.

FIG. 3 shows a further embodiment of the denoxing apparatus according to the invention with a combination of heat store and catalyser. With this embodiment the flue gases A are directed in alternating direction through the two channels 14 comprising several sequentially arranged heat storage modules 15 and a space 16 arranged in between them for regenerative postcombustion of the carbon monoxide CO and/or the gaseous organic substances in the flue gases A. Due to the flow direction heat energy is extracted from the flue gases A in the heat storage modules 15, which heat energy is necessary in order to bring the flue gases A up to the reaction temperature $T_R$ of the catalysers 6. Fuel such as natural gas may be supplied via a line 17. Lines 18 or 18a are provided for adding, after flow reversal, the substances necessary for catalytic reduction in the catalysers 6, preferably ammonia. Control of the alternating flow direction is effected by corresponding control devices (not shown). The heat storage modules 15 may be formed by ceramic honeycomb bodies. The variant according to FIG. 3 requires catalysers 6 with a wider reaction temperature $T_R$ range because the temperature cannot be kept constant due to the alternating direction of the flue gases A. For this an extra heat exchanger 11 is not needed, rather this is integrated in channels 14 by means of the heat storage modules 15. Omission of the extra heat exchanger also means reduced apparatus input.

The invention claimed is:

1. A process for denoxing carbon monoxide and gaseous organic substances containing flue gases by selective catalytic reduction of nitrogen oxides, which comprises the steps of:

directing the flue gases in a first flow direction through at least a first channel and a second channel, the first channel having at least a first and a second heat storage module and the second channel having at least a third and a fourth heat storage module, the first and second heat storage modules being sequentially disposed in the first channel and the third and fourth heat storage module being sequentially disposed in the second channel;

performing the selective catalytic reduction of the nitrogen oxides in a first catalyzer disposed between the first and second heat storage modules in the first channel and in a second catalyzer disposed between the third and fourth heat storage modules in the second channel;

prior to the selective catalytic reduction in the first catalyzer, heating the flue gases in the first heat storage module by heat exchange with a recovered residual heat of denoxed flue gases to a reaction temperature of 160° C. to 500° C.;

after the selective catalytic reduction in the first catalyzer, heating the flue gases in the second storage module by heat exchange to increase the flue gas temperature for subsequent regenerative post-combustion of the carbon monoxide and the gaseous organic substances contained in the flue gases;

partially compensating for heat displacement losses from the heat exchange by regenerative post-combustion of the carbon monoxide and the gaseous organic substances contained in the flue gases at combustion temperatures from 750° to 900° C. in a space disposed between the first and second channels, wherein additional nitrogen oxides are created during the regenerative post-combination and the additional nitrogen oxides and the nitrogen oxides contained in the flue gases are subjected to the selective catalytic reduction in the first and second catalyzers; and alternating a reversal of the flow direction of the flue gases through the first and second channels and the space between the first and second channels.

2. The process according to claim 1, which further comprises supplying external heat energy for start-up and/or for maintaining an operating temperature for denoxing the flue gases.

3. The process according to claim 1, which further comprises adding combustible substances to the flue gases prior to the regenerative post-combustion.

4. The process according to claim 1, which further comprises increasing the carbon monoxide and the gaseous organic substances content in the flue gases specifically through combustion-technical measures.

5. The process according to claim 1, which further comprises denoxing the flue gases to at least 60%.

\* \* \* \* \*